United States Patent [19]

Lynch et al.

[11] Patent Number: 4,714,564

[45] Date of Patent: Dec. 22, 1987

[54] HIGH PERFORMANCE MULTIFUNCTIONAL CORROSION INHIBITORS ESPECIALLY FOR COMBINING AT 20 TO 50 WEIGHT PERCENT WITH SOAP OR PAINT

[75] Inventors: Charles T. Lynch, Fairborn; Fred W. Vahldiek, Dayton; Mohammad Khobaib, Fairborn, all of Ohio

[73] Assignee: The United States of America as represented by the Secretary of the Air Force, Washington, D.C.

[21] Appl. No.: 370,236

[22] Filed: Apr. 21, 1982

[51] Int. Cl.$^4$ .................. C11D 9/16; C23F 11/06; C23F 11/18; C09K 3/00

[52] U.S. Cl. .................. 252/110; 252/DIG. 5; 252/389.2; 252/389.3; 252/389.4; 422/13; 422/14; 422/18; 422/19; 106/14.12; 106/14.21; 106/14.37

[58] Field of Search ............... 252/389.2, 389.3, 389.4, 252/389.52, 389.62, DIG. 5, 110; 422/13, 14, 18, 19; 106/14.12, 14.21, 14.42, 14.44, 14.37

[56] References Cited

U.S. PATENT DOCUMENTS

| | | | |
|---|---|---|---|
| 2,815,328 | 12/1957 | Green et al. | 252/391 |
| 3,222,291 | 12/1965 | Heit et al. | 252/389 |
| 3,257,316 | 6/1966 | Langguth et al. | 252/2 |
| 3,308,161 | 3/1967 | Shen | 260/583 |
| 3,357,927 | 12/1967 | Marsh et al. | 252/389.2 |
| 3,580,934 | 5/1971 | Murray et al. | 252/389.2 |
| 4,108,790 | 8/1978 | Foroulis | 252/175 |
| 4,163,733 | 8/1979 | Buckman et al. | 252/180 |
| 4,209,487 | 6/1980 | Hogue et al. | 422/12 |
| 4,324,797 | 4/1982 | Suzuki | 252/389.52 X |
| 4,338,209 | 6/1982 | Manabe et al. | 252/389.2 |
| 4,383,937 | 5/1983 | Williams | 252/389.62 |
| 4,402,747 | 9/1983 | Bird et al. | 106/14.42 |
| 4,406,811 | 9/1983 | Christensen et al. | 252/389.2 X |

OTHER PUBLICATIONS

"Material and Process Applications for Land, Sea, Air, Space", vol. 26, pp. 52-64, 1981, Sampe, Los Angeles, CA, proceedings volume on sale at meeting, Apr. 28, 1981 and thereafter.

Primary Examiner—Matthew A. Thexton
Attorney, Agent, or Firm—Charles E. Bricker; Donald J. Singer

[57] ABSTRACT

A multifunctional corrosion inhibitor consisting essentially of an alkali metal borate, an alkali metal nitrate, an alkali metal nitrite, an alkali metal metasilicate, an alkali metal phosphate, mercaptobenzothiazole and at least one selected surfactant.

4 Claims, 7 Drawing Figures

HIGH PERFORMANCE MULTIFUNCTIONAL CORROSION INHIBITORS ESPECIALLY FOR COMBINING AT 20 TO 50 WEIGHT PERCENT WITH SOAP OR PAINT

RIGHTS OF THE GOVERNMENT

The invention described herein may be manufactured and used by or for the Government of the United States for all governmental purposes without the payment of any royalty.

BACKGROUND OF THE INVENTION

This invention relates to corrosion inhibiting compositions and to a process for inhibiting the corrosion of metals. In particular, this invention relates to a multifunctional inhibitor that provides both anodic and cathodic corrosion inhibition for a broad spectrum of metallic materials and structures in aggressive media such as brine, bilge solution and high-chloride contaminated water.

The financial loss due to the degradative effects resulting from corrosion reactions amounts to billions of dollars annually. In an attempt to combat the problem of corrosion and minimize its economic disadvantages, a U.S. Air Force research effort was initiated to develop improved inhibiting compositions. As a part of this research effort a survey and screening of conventional inhibitor compositions such as the polyphosphates, silicates, orthophosphates, chromates, nitrites, and combinations thereof was undertaken to determine their effectiveness in inhibiting corrosion of aircraft structures. Film-forming inhibitors, such as emulsified or soluble oils, long chain amines, alcohols and carboxylic acids were also studied.

Unfortunately, anodic inhibitors, such as the chromates, may cause accelerated corrosion when in contact with a metal in too low a concentration, such as where the concentration decreases during use. The result may be a metal surface protected in most areas, but giving rise to accelerated corrosion in small, highly anodic areas of the metal surface. On the other hand, a significant advantage of chromate inhibiting formulations is their broad protective ability against general corrosion of many metals and alloys.

For nonchromate systems, a rather complex mixture is required to achieve such broad-based protection. The simple borax-nitrite system is, for example, effective for many steels, but must be complemented by other inhibitors to provide adequate protection for high strength aluminum alloys, particularly in the presence of corrosive contaminants such as sodium chloride.

Other inhibitor systems are applicable only to a limited number of alloys or lack the degree of protection for satisfactory and adequate protection for aerospace and other high performance (high strength, high strength:weight ratio, high fatigue resistance) structural alloys. Still other inhibitor systems have not been found satisfactory for use with high performance alloys in the presence of sodium chloride. Commercial formulations which have been tested on aerospace alloys, such as 7075-T6Al, 2024-T3Al, and 4340 steel, in the presence of sodium chloride in aqueous solutions have ranged from totally ineffective to partially effective in immersion tests.

Toxicity has become an increasingly important consideration in recent years, both with respect to handling of the compounds prior to use, and to the effects of disposal on humans, animals and plants. Consequently, it is necessary to develop substitutes for such popular inhibitors as chromate based formulations and high phosphate based formulations.

A previous study on corrosion prevention of carrier-based aircraft revealed that a considerable savings could be realized in terms of corrosion maintenance by merely rinsing the aircraft with water to remove detrimental particles, such as salt and ash. How, ever, in rinsing aircraft, a very good possibility exists that the water will be trapped in crevices or so-called dry-bay areas. The trapped water, often chemically hard, can cause serious corrosion problems, hence completely jeopardizing the advantage of water rinsing as a corrosion-control method. Therefore, the incorporation of a low concentration of a nontoxic, water-soluble inhibitor into the rinse water becomes a desirable means for improving corrosion resistance.

The value of borax-nitrite as a corrosion inhibitor has long been recognized. Earlier work has shown this combination to be very effective in controlling general corrosion as well as crevice corrosion of high strength steels. However, the borax-nitrite combination was not found to be effective against the corrosion of other ferrous and nonferrous metals and alloys. For example, nitrite inhibitors are more effective at higher pH ranges (e.g., 8-9) than at more acidic levels. Very high pH levels, however, can be deleterious to some aluminum alloys since aluminum is amphoteric, subject to attack by strong basic solutions.

In our copending application Ser. No. 265,734, filed May, 1981, now abandoned we disclose corrosion inhibiting compositions which are biodegradable, contain no chromates, and offer important and unique advantages over chromate-based inhibitor combinations. The compositions are multifunctional, providing both anodic and cathodic protection. The compositions are nontoxic, low in cost, soluble in aqueous solution and provide protection for a broad spectrum of metallic structures. Concentration of the inhibitor composition in aqueous rinsing solution is nominally 0.3 to 0.5 percent, by weight, of the rinse solution. The inhibiting compositions include sodium borate, sodium nitrite, sodium hexametaphosphate, sodium metasilicate, sodium nitrate and mercaptobenzothiazole in a predetermined range of concentrations.

We have found that the effectiveness of the compositions disclosed by us in the aforesaid application Ser. No. 265,734 can be improved by the addition thereto of selected surfactant compounds. These improved corrosion inhibiting formulations are particularly useful in very aggressive environments containing chloride ion in excess of 1000 ppm (0.1 weight percent). Such high levels may be found in coastal areas and in urine, which contains approximately one weight percent sodium chloride, or about 6000 ppm of chloride ion.

Accordingly, it is an object of the present invention to provide an improved multifunctional corrosion inhibiting composition.

Other objects and advantages of the present invention will be readily apparent to those skilled in the art from a consideration of the following disclosure.

SUMMARY OF THE INVENTION

In accordance with the present invention there is provided an improved corrosion inhibiting composition consisting essentially of a mixture of an alkali metal borate, an alkali metal nitrite, an alkali metal nitrate, an alkali metal metasilicate, an alkali metal phosphate, mercaptobenzothiazole (MBT), at least one selected surfactant. In some formulations, zinc sulfate and benzotriazole (BT) are also required. The alkali metal can be either sodium or potassium.

DESCRIPTION OF THE PREFERRED EMBODIMENTS

The amounts of each component of the inhibiting composition of this invention are given in Table I, below.

TABLE I

| Component | Concentration in aqueous solution (weight percent) | | Concentration of Dry Ingredients (percent) |
|---|---|---|---|
| | Broad | Preferred | |
| Borate | .20–2.00 | 0.25–1.40 | 68.0–70.0 |
| Nitrite | .04–.25 | .05–.20 | 8.5–14.0 |
| Nitrate | .04–.50 | .05–.40 | 13.5–17.5 |
| Silicate | .0015–.05 | .005–.04 | 0.5–1.75 |
| Phosphate | .0025–.025 | .005–.02 | 0.8–0.9 |
| MBT | .0008–.015 | .003–.012 | 0.25–0.5 |
| BT | .0008–.015 | .003–.012 | 0.25–0.5 |
| ZnSO$_4$ | .003–.06 | .005–.05 | 1.0–2.0 |
| Surfactant | .006–.03 | .0050–.025 | 1.0–2.0 |

The surfactant is a selected anionic or nonionic surface active material. The selected surfactants employed in the corrosion inhibitor of the present invention are, in general, proprietary materials. Table II, below, lists the surfactants employed according to the present invention by (1) an arbitrary designation, (2) a brief description of the composition of the surfactant, (3) the commercial name of the surfactant, and (4) the source for such surfactant.

TABLE II

Proprietary Surface Active Agents

| Designation[1] | Description[2] | Commercial[3] Name | Source[4] |
|---|---|---|---|
| SAR | Sodium Dodecylbenzene Sulfonate | Richonate | The Richardson Company Des Plaines, Illinois |
| SAD | Sodium salt of Phosphonic acid | Dequest | Monsanto Company St. Louis, Missouri |
| SAB | Corrosion inhibitor (commercial formulation) with complex sulfonate compound | Boeshield T-9 | Oxy Metal Industries Corp. Madison Heights, MI |
| SAM | Dialkyl alkyl phosphonate | | Mobil Chemical Company Phosphorous Division Richmond, Virginia |
| SAP | High molecular weight phosphate | | Monsanto Company St. Louis, Missouri |
| SAT | Octylphenoxy polyethoxy ethanol | Triton X-114 | Rohm and Haas Co. Industrial Chemicals - NA Philadelphia, Pennsylvania |
| SAO | High molecular weight calcium sulfonate | 100 Oil | The Southland Corp. Arthur C. Trask Chemical Division Summit, Illinois |
| SAE | High molecular weight Barium sulfonate | Estersulf | The Southland Corp. Arthur C. Trask Chemical Division Summitt, Illinois |
| SAG | Sodium salt of a complex Phosphate ester | | GAF Corporation New York, New York |

Figure 1:
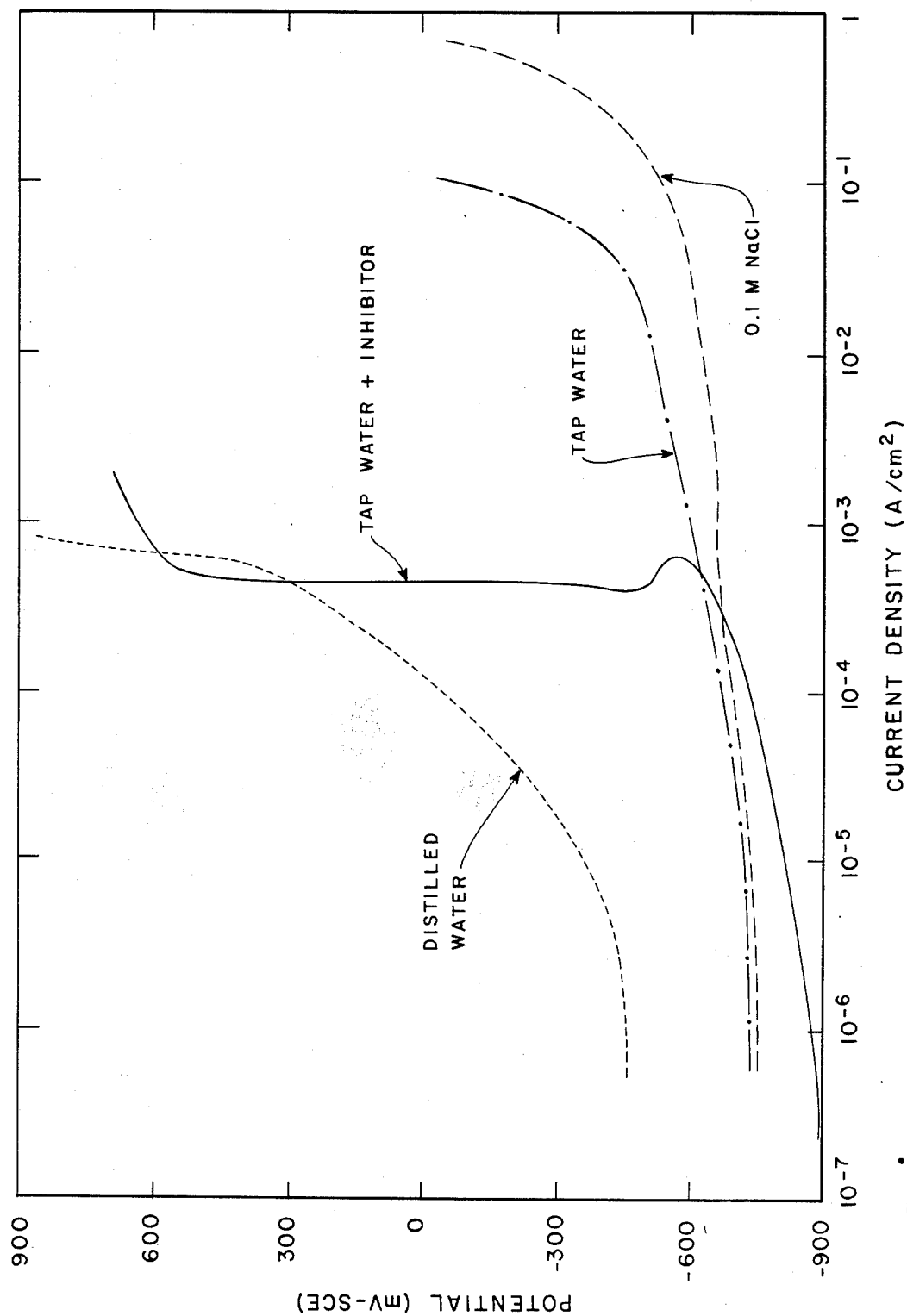
FIG. 1 illustrates the anodic-polarization behavior of type 7075-T6 aluminum in local top water, distilled water, 0.1M NaCl and the basic inhibitor solution.
Figure 2:
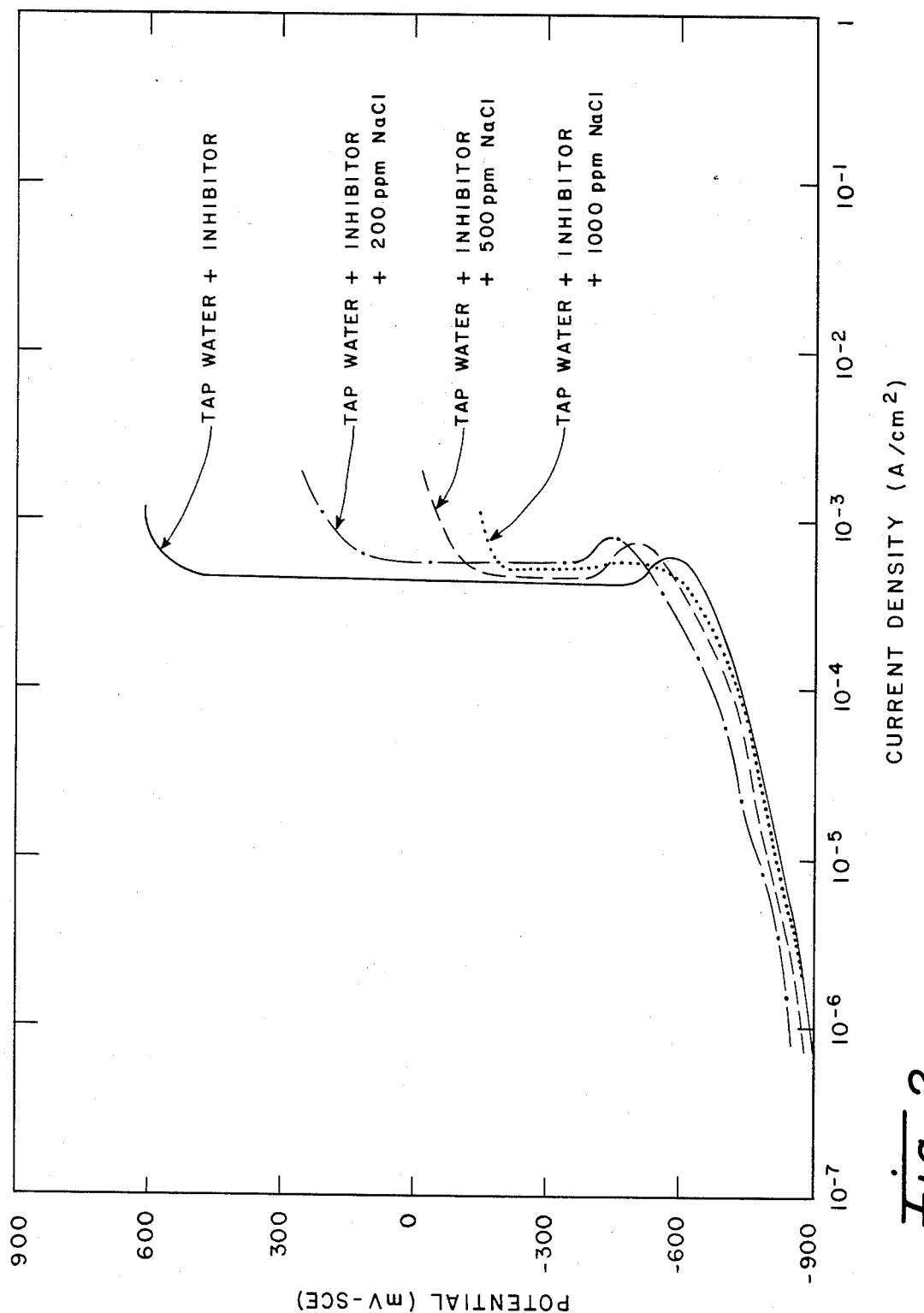
FIG. 2 illustrates the effect of increasing chloride concentration upon the breakdown of passivity of type 7075-T6 aluminum.
Figure 3:
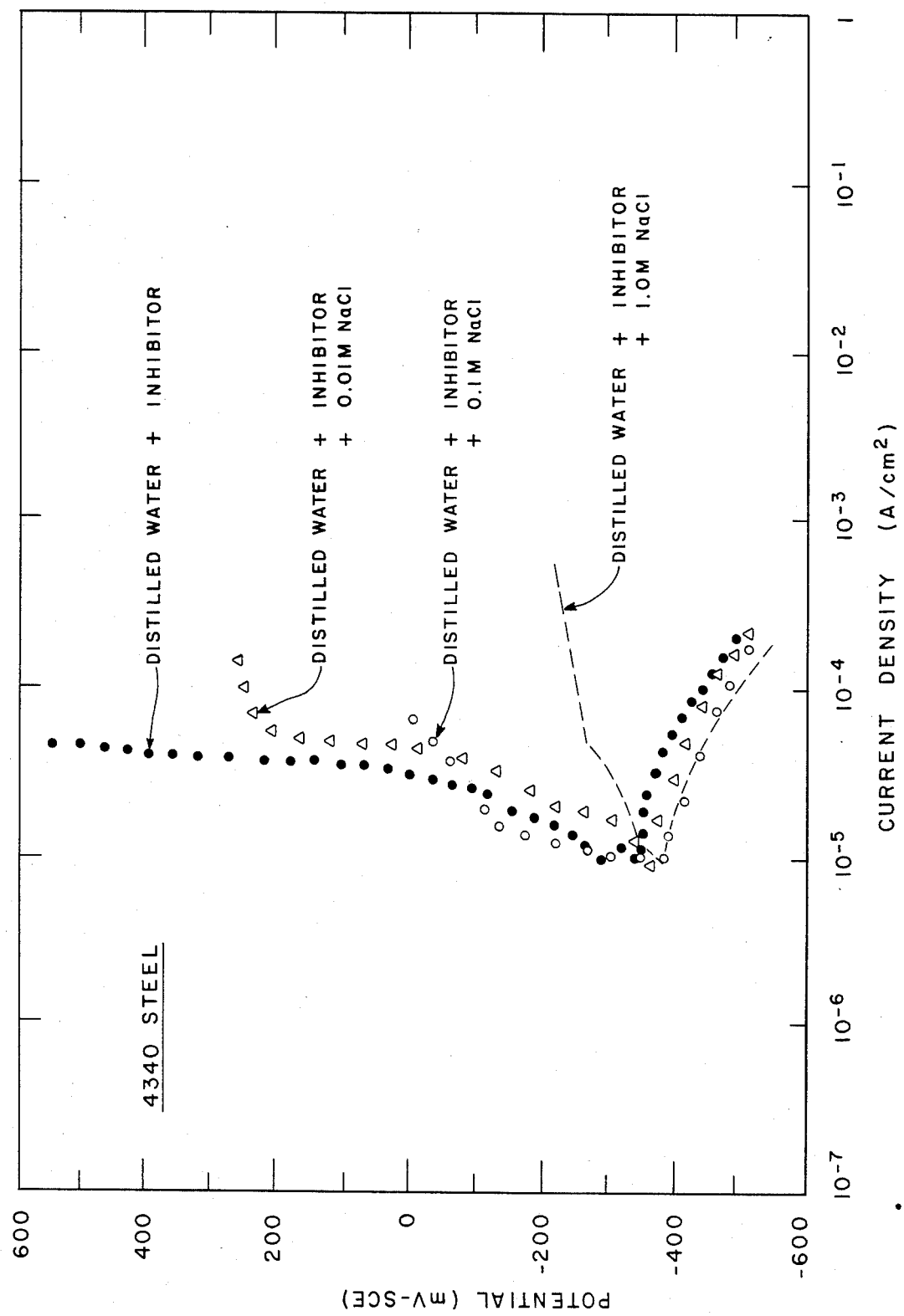
FIG. 3 illustrates the effect of increasing chloride concentration upon the breakdown of passivity of type 4340 steel.

Referring now to the drawings, FIG. 1 shows the anodic polarization behavior of type 7075-T6 aluminum in distilled water, local tap water, a 0.1 molar solution of sodium chloride and local tap water containing the corrosion inhibitor disclosed in the aforementioned application Ser. No. 265,734. This figure illustrates a very high corrosion current and breakdown in passivity in tap water and in 0.1M NaCl, as well as illustrating the protection afforded by the aforesaid corrosion inhibitor. FIG. 2 illustrates the effect of increasing chloride concentration upon the breakdown of passivity of type 7075-T6 aluminum. FIG. 3 illustrates a similar type of behavior with type 4340 steel.

Figure 4:
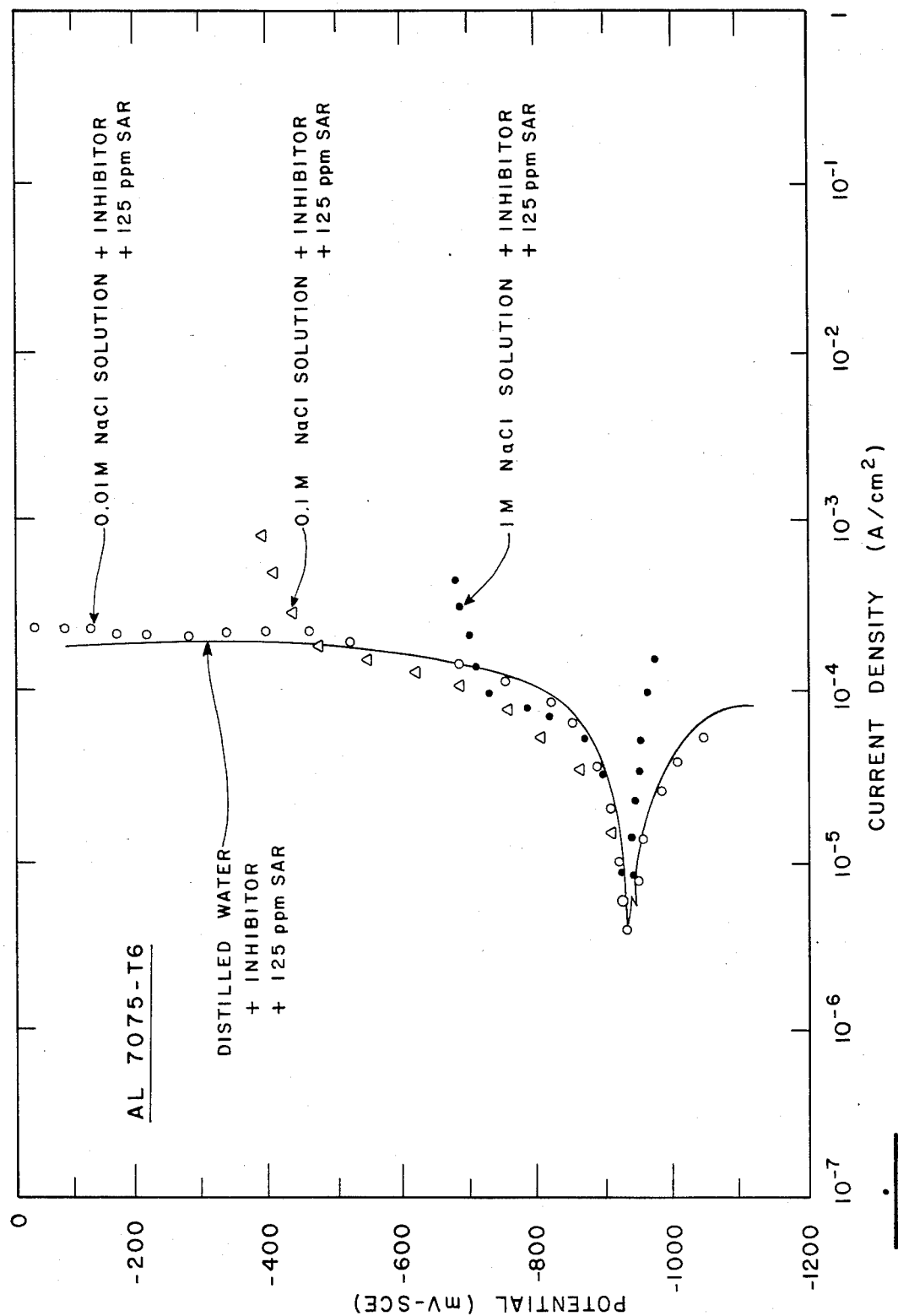
FIG. 4 illustrates the effect of adding a surfactant to an inhibitor solution in preserving passivity of type 7075-T6 aluminum.
Figure 5:
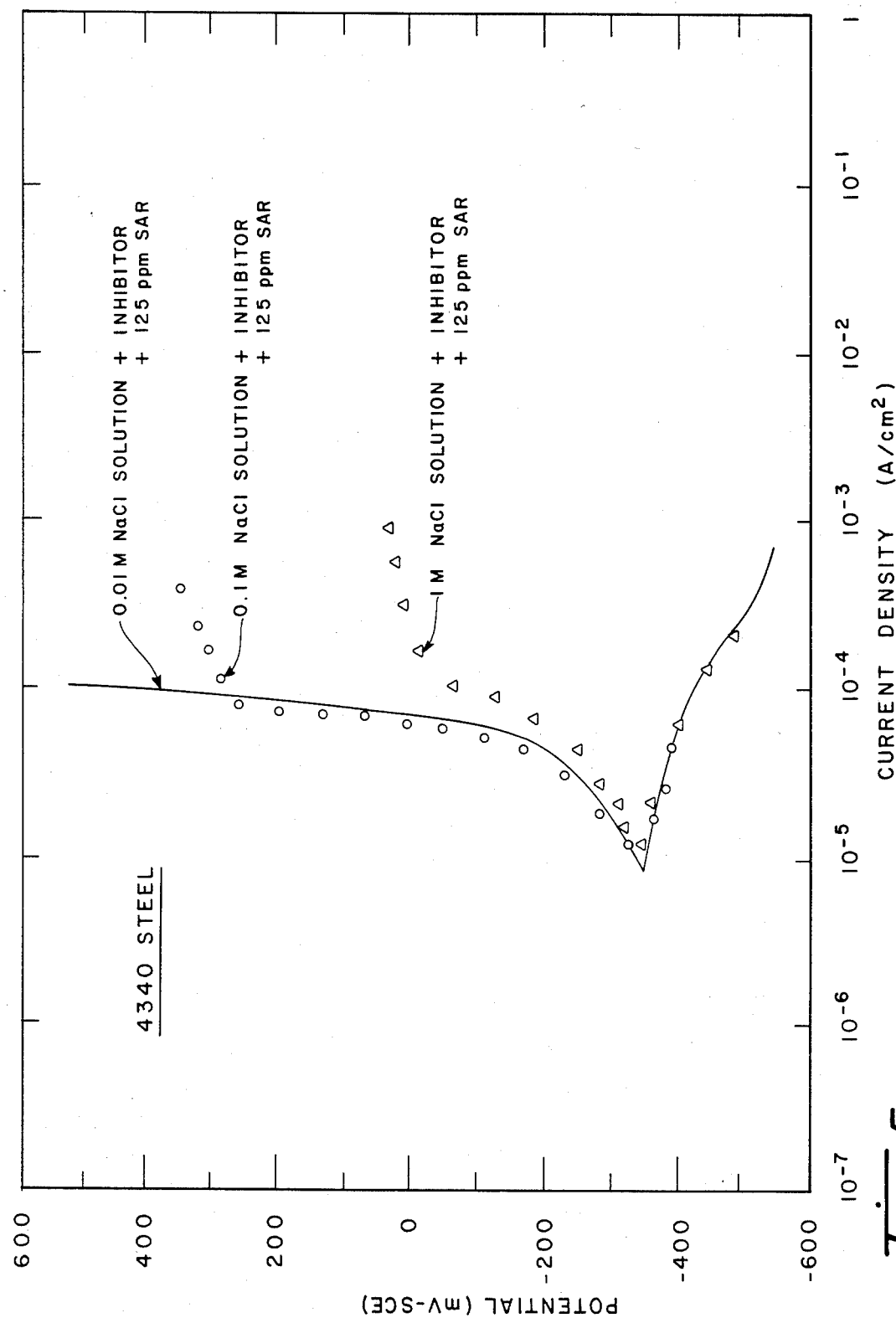
FIG. 5 illustrates the effect of adding a surfactant to an inhibitor solution in preserving passivity of type 4340 steel.

FIGS. 4 and 5 illustrate the effect of adding 125 ppm of sodium dodecylbenzene sulfonate (SAR) to solutions of increasing chloride concentration, each containing the basic inhibitor mentioned above. A comparison of FIG. 4 with FIG. 2, although not strictly comparable, clearly indicates the increased protection afforded by the addition of sodium dodecylbenzene sulfonate to the basic inhibitor formulation. A more direct correlation is seen by reference to FIGS. 5 and 3.

Figure 6:
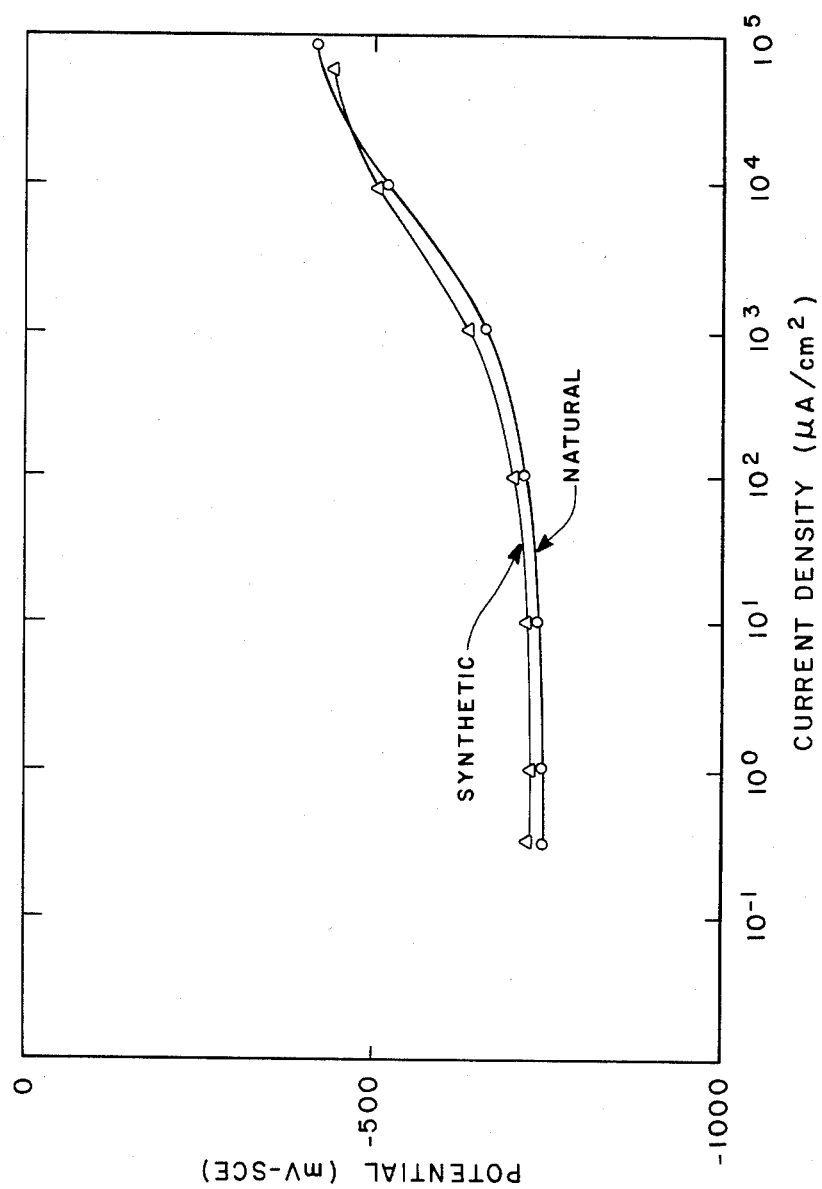
FIG. 6 illustrates the anodic polarization of type 7075-T6 aluminum in natural and in synthetic urine.
Figure 7:
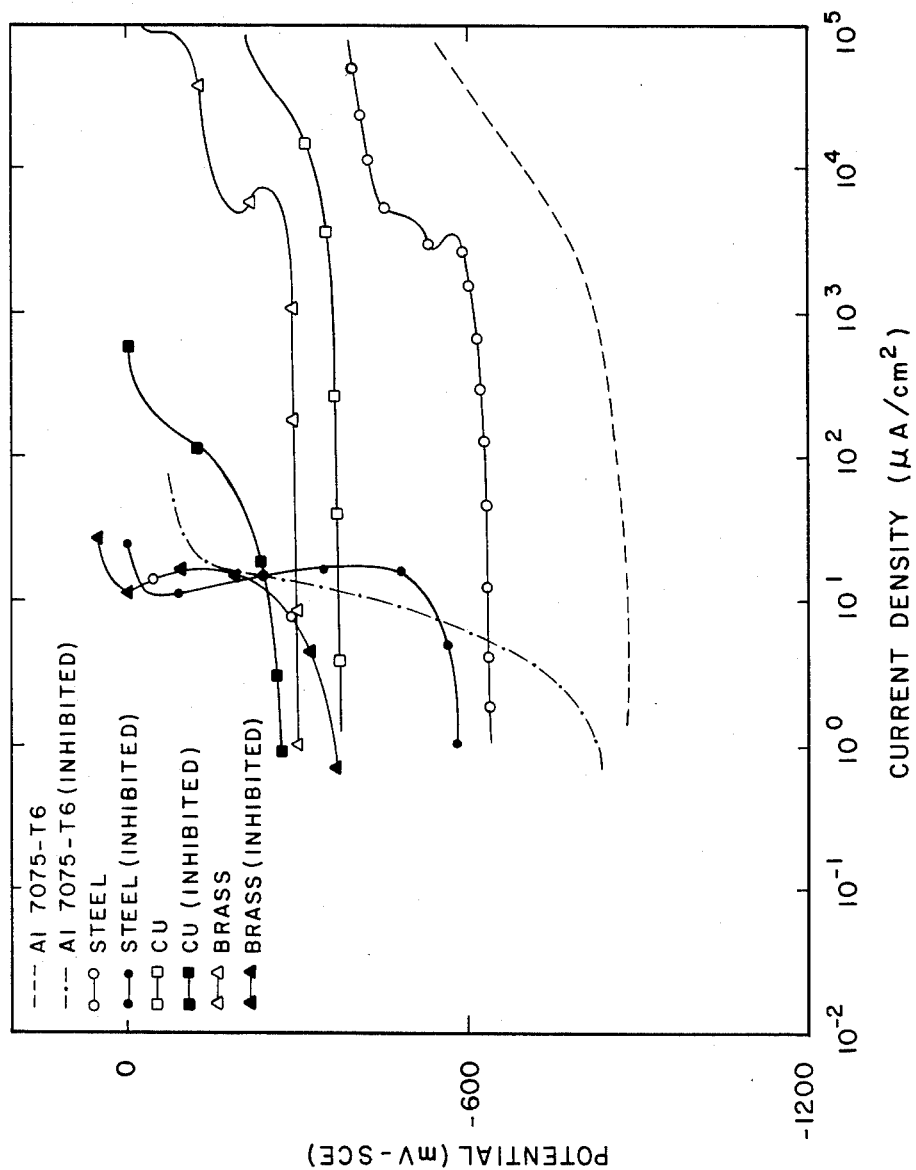
FIG. 7 illustrates the effects of adding the inhibitor composition of this invention for preserving the passivity of various metals in synthetic urine solution.

FIGS. 6 and 7 illustrate the anodic polarization behavior of various metals in a synthetic urine solution. The composition of the synthetic urine is given in Table III below.

TABLE III

Ingredients of Synthetic Urine (Wt in gm/liter)

| | |
|---|---|
| urea | 20.60 |
| 5-hydroxindoleacetic acid | 0.0045 |
| uric acid | 0.052 |
| glucuronic acid | 0.431 |
| oxalic acid | 0.031 |
| citric acid | 0.462 |
| glycolic acid | 0.042 |
| creatine | 0.0721 |
| guanidinoacetic acid | 0.027 |
| formic acid | 0.013 |
| glucose | 0.072 |
| ammonium sulfate | 4.00 |
| potassium phosphate | 0.175 |
| potassium chloride | 0.0100 |
| potassium bromide | 0.008 |
| sodium chloride | 10.00 |
| p-cresol | 0.087 |
| creatinine | 1.500 |
| acetone | 0.0001 |
| hydroxyquinoline-2 carboxylic acid | 0.0028 |
| potassium sulfate | 0.134 |

FIG. 6 illustrates that the corrosive behavior of synthetic urine closely approximates that of natural urine. FIG. 7 illustrates the anodic polarization behavior of type 7075-T6 aluminum, type 4340 steel, copper and brass in synthetic urine and in synthetic urine inhibited by the multifunctional inhibitor formulation containing 125 ppm of sodium dodecylbenzene sulfonate.

More specific inhibitor formulations are given in Tables IV and V below. All amounts are given in weight percent (in aqueous solution).

TABLE IV

| | Formulation | | | |
|---|---|---|---|---|
| Component | 1 | 2 | 3 | 4 |
| Borate | 0.35 | 0.35 | 0.35 | 0.35 |
| Nitrite | .20 | .20 | .20 | .20 |
| Nitrate | .20 | .20 | .20 | .20 |
| Silicate | .01 | .01 | .01 | .01 |
| Phosphate | .0125 | .005 | .005 | .005 |
| MBT | .0065 | .005 | .005 | .005 |
| BT | .005 | .005 | .005 | .005 |
| SAR, SAE | .0125 | — | .0075 | — |
| SAD | .0165 | — | — | — |
| SAT | — | .01 | — | — |
| SAB | — | — | — | .025 |
| ZnSO$_4$ | .004 | .02–.04 | .01 | — |

TABLE V

| | Formulations | | |
|---|---|---|---|
| Component | 5 | 6 | 7 |
| Borate | 0.25 | 0.35 | 1.40 |
| Nitrite | .05 | .05 | .20 |
| Nitrate | .05 | .10 | .40 |
| Silicate | .002 | .01 | .04 |
| Phosphate | .003 | .005 | .02 |
| MBT | .001 | .003 | .012 |
| BT | — | .003 | — |
| SAR | .0075 | .0075 | .0075 |

Formulation 1 is preferred for use where the concentration of chloride is very high, e.g., brine. Formulations 2 and 3 are recommended for use in aggressive solutions such as are found in the bilge areas of aircraft. Formulation 4 will provide protection in high chloride contaminated water, i.e., up to about 1 weight percent NaCl.

Formulation 6 is a preferred formulation for general purpose use. It is effective where little or no dilution is expected during use and low concentrations of chloride and other aggressive reactants are present, i.e., up to about 100 ppm chloride ion. Formulation 5 is effective in situations where no dilution is expected and the concentration of chloride ion or other aggressive reactant is very low. Formulation 7 is for contact inhibitors to form a protective surface layer during immersion.

The concentrations of the various components can be varied by about 20% for conditions where dilution in use is expected.

In Table VI, below, the representative results of tests with several experimental formulations are summarized. These immersion tests were carried out on type 7075-T6 aluminum and type 4340 steel in 1M NaCl solutions.

TABLE VI

Immersion Test Results

| No | Inhibitor wt % in 1M NaCl | pH Initial | pH Final | Specimen | Time of Exposure (weeks) | Surface Appearance (Visual Observation) | Remarks |
|---|---|---|---|---|---|---|---|
| 1 | 0.35 Borate + 0.2 Nitrate + 0.2 Nitrite + 0.01 Silicate + 50 ppm Phosphate + 30 ppm MBT + 100 ppm SAO | 7.90 | 7.90 | Al Steel | 2 2 | Several pits Clean & shiny; few pits | Better Inhibitor required |
| 2 | 0.35 Borate + 0.6 Nitrate + 0.6 Nitrite + 0.01 Silicate + 50 ppm Phosphate + 30 ppm MBT | 8.30 | 8.20 | Al Steel | 1 6 1 6 | Clean Few pits Clean, Few fine pits Many pits at edge | Better Inhibitor required |
| 3 | 0.35 Borate + 0.2 Nitrate + 0.05 Nitrite + 0.01 Silicate + 50 ppm Phosphate + 50 ppm MBT + 100 ppm SAE | 8.20 | 8.15 | Al Steel | 4 16 4 16 | Clean & shiny Clean & shiny Clean, pits Clean, several pits | Improvement required |
| 4 | 0.35 Borate + 0.2 Nitrate + 0.05 Nitrite + 0.01 Silicate + 50 ppm Phosphate + 50 ppm SAM | 8.20 | 8.25 | Al Steel | 2 2 | Dull, patches of Corrosion Several pits | Better Inhibitor required |
| 5 | 0.35 Borate + 0.1 Nitrate + 0.05 Nitrite + 0.01 Silicate + 50 ppm Phosphate + 50 ppm | 8.80 | 8.70 | Al | 2 10 | Clean Clean, few corrosion streaks | Fair |

TABLE VI-continued

Immersion Test Results

| No | Inhibitor wt % in 1M NaCl | pH Initial | pH Final | Specimen | Time of Exposure (weeks) | Surface Appearance (Visual Observation) | Remarks |
|---|---|---|---|---|---|---|---|
|  | MBT + 50 ppm SAP + 100 ppm SAE |  |  | Steel | 2 | Clean |  |
|  |  |  |  |  | 10 | Clean, pits |  |
| 6 | 0.35 Borate + 0.2 Nitrate + 0.2 Nitrite + 0.01 Silicate + 125 ppm Phosphate + 60 ppm MBT + 100 ppm SAR + 210 ppm SAD + 40 ppm ZnSO$_4$ | 8.15 | 8.10 | Al | 2 | Clean & shiny | Excellent inhibition |
|  |  |  |  |  | 12 | Clean & shiny |  |
|  |  |  |  | Steel | 2 | Clean & shiny |  |
|  |  |  |  |  | 12 | Clean & shiny, two fine pits |  |
| 7 | 0.35 Borate + 0.2 Nitrate + 0.2 Nitrite + 0.01 Silicate + 50 ppm Phosphate + 75 ppm SAT + 500 ppm ZnSO$_4$ | 8.15 | 8.20 | Al | 2 | Clean & shiny | Excellent Inhibitor |
|  |  |  |  |  | 8 | Clean & shiny |  |
|  |  |  |  | Steel | 2 | Clean & shiny |  |
|  |  |  |  |  | 8 | Clean & shiny |  |
| 8 | 0.35 Borate + 0.2 Nitrate + 0.2 Nitrite + 0.01 Silicate + 50 ppm Phosphate + 100 ppm MBT + 75 ppm SAR + 100 ppm ZnSO$_4$ | 9.35 | 9.20 | Al | 2 | Clean & shiny | Excellent Inhibitor |
|  |  |  |  |  | 8 | Clean & shiny |  |
|  |  |  |  | Steel | 2 | Clean & shiny |  |
|  |  |  |  |  | 8 | Clean & shiny, one fine pit |  |
| 9 | 1% SAB | 6.25 | 6.25 | Al | 4 | Clean & shiny | Better Inhibitor required |
|  |  |  |  |  | 24 | Badly corroded |  |
|  |  |  |  | Steel | 4 | Clean & shiny |  |
|  |  |  |  |  | 24 | Badly corroded |  |
| 10 | 0.35 Borate + 0.2 Nitrate + 0.2 Nitrite + 0.01 Silicate + 50 ppm Phosphate + 100 ppm MBT + 250 ppm SAB | 8.15 | 8.20 | Al | 2 | Clean & shiny | Excellent Inhibitor |
|  |  |  |  |  | 8 | Clean & shiny |  |
|  |  |  |  | Steel | 2 | Clean, one pit |  |
|  |  |  |  |  | 8 | Clean & shiny |  |

In Table VI above and in Table VII, below, the term borate refers to sodium borate tetrahydrate, nitrate to sodium nitrate, nitrite to sodium nitrite, silicate to sodium metasilicate pentahydrate, and phosphate to sodium hexametaphosphate.

In Table VII below, the representative results of tests with several experimental formulations are summarized. These tests were carried out on type 7075-T6 aluminum, type 4340 steel, and brass in synthetic urine solution, and in a mixture of synthetic urine and coffee.

The corrosion inhibiting formulations of this invention may be used in aqueous solution as rinse-type inhibitors and as immersion-type inhibitors. The corrosion inhibitor may be compounded dry, and stored in bulk for later solution in water. In the dry form, the corrosion inhibitor may be incorporated from 20 to 50 weight percent, preferably about 30 weight percent, into a commercial soap formulation, e.g., a handsoap, for use in the lavatory of an aircraft or ship.

The corrosion inhibitor may be incorporated into a coating composition, such as a paint primer by encapsulating the inhibitor formulation with a cellulosic or

TABLE VII

| No | Inhibitor wt % in synthetic urine* | pH Initial | pH Final | Specimen | Time of Exposure (weeks) | Surface Appearance (Visual Observation) | Remarks |
|---|---|---|---|---|---|---|---|
| 11 | 0.35 borate + 0.2 nitrite + 0.2 nitrate + 0.01 silicate + 100 ppm ZnSO$_4$ + 50 ppm phosphate + 75 ppm SAR | 9.35 | 9.25 | Al | 2 | Clean & shiny | Excellent |
|  |  |  |  |  | 8 | Clean & shiny |  |
|  |  |  |  | Steel | 2 | Clean & shiny |  |
|  |  |  |  |  | 8 | Clean & shiny, one fine pit |  |
| 12 | 0.35 borate + 0.2 nitrite + 0.2 nitrate + 0.01 silicate + 0.01 phosphate + 0.01 MBT + 125 ppm SAR | 8.50 | 8.50 | Al | 4 | Clean & shiny | Excellent |
|  |  |  |  | Steel | 4 | Clean & shiny |  |
|  |  |  |  | Brass | 4 | Clean & shiny |  |
| 13 | 0.35 borate + 0.2 nitrite + 0.2 nitrate + 0.01 silicate + 125 ppm phosphate + 60 ppm MBT + 40 ppm ZnSO$_4$ + 100 ppm SAR + 200 ppm SAD | 8.15 | 8.15 | Al | 2 | Clean & shiny | Excellent |
|  |  |  |  |  | 12 | " |  |
|  |  |  |  | Brass | 2 | " |  |
|  |  |  |  |  | 12 | " |  |
|  |  |  |  | Steel | 2 | " |  |
|  |  |  |  |  | 12 | Clean & shiny, three fine pits |  |
| 14 | 0.35 borate + 0.2 nitrite + 0.2 nitrate + 0.01 silicate + 50 ppm phosphate + 100 ppm MBT + 250 ppm SAB | 8.15 | 8.15 | Al | 2 | Clean & shiny | Excellent |
|  |  |  |  |  | 8 | " |  |
|  |  |  |  | Brass | 2 | " |  |
|  |  |  |  |  | 8 | " |  |
|  |  |  |  | Steel | 2 | Clean, one pit appearing on one surface |  |
|  |  |  |  |  | 8 | Clean & shiny |  |
| 15 | 0.35 borate + 0.2 nitrite + 0.2 nitrate + 0.01 silicate + 50 ppm MBT + 500 ppm ZnSO$_4$ + 75 ppm SAT | 8.15 | 8.00 | Al | 4 | Clean & shiny | Excellent |
|  |  |  |  |  | 32 | " |  |
|  |  |  |  | Brass | 4 | " |  |
|  |  |  |  |  | 32 | " |  |
|  |  |  |  | Steel | 4 | " |  |
|  |  |  |  |  | 32 | " |  |

*Except Run 15 which was 50% synthetic urine and 50% coffee.

The corrosion inhibiting formulations of this invention may be used in aqueous solution as rinse-type inhibnylon or other suitable encapsulating material using conventional encapsulating techniques, and incorporating 20 to 50 weight percent, preferably about 30 weight percent, of the encapsulated inhibitor into a conventional coating composition. The corrosion inhibiting components may be released if the coated surface is scratched or otherwise physically damaged.

Various modifications can be made to the above described invention.

We claim:

1. A soap formulation comprising from 20 to 50 weight percent of a multifunctional corrosion inhibiting composition, said composition consisting essentially of the following components in the approximate concentrations indicated, in weight percent:

| Component | Concentration | | |
|---|---|---|---|
| Alkali metal borate | 68.0 | to | 70.0 |
| Alkali metal nitrate | 8.5 | to | 14.0 |
| Alkali metal nitrite | 13.5 | to | 17.5 |
| Alkali metal metasilicate | 0.5 | to | 1.7 |
| Alkali metal phosphate | 0.8 | to | 0.9 |
| Mercaptobenzothiazole (MBT) | 0.25 | to | 0.5 |
| At least one selected surfactant | 1.05 | to | 2.0 |
| and, optional, the following components: | | | |
| Zinc sulfate | 1.0 | to | 2.0 |
| Benzotriazole (BT) | 0.25 | to | 0.5 |

2. The soap of claim 1 wherein the concentration of said corrosion inhibiting composition is about 30 weight percent.

3. A paint formulation comprising from 20 to 50 weight percent of an encapsulated, dry multifunctional corrosion inhibiting composition, said composition consisting essentially of the following components in the approximate concentrations indicated, in weight percent:

| Component | Concentration | | |
|---|---|---|---|
| Alkali metal borate | 68.0 | to | 70.0 |
| Alkali metal nitrate | 8.5 | to | 14.0 |
| Alkali metal nitrite | 13.5 | to | 17.5 |
| Alkali metal metasilicate | 0.5 | to | 1.7 |
| Alkali metal phosphate | 0.8 | to | 0.9 |
| Mercaptobenzothiazole (MBT) | 0.25 | to | 0.5 |
| At least one selected surfactant | 1.05 | to | 2.0 |
| and, optional, the following components: | | | |
| Zinc sulfate | 1.0 | to | 2.0 |
| Benzotriazole (BT) | 0.25 | to | 0.5 |

4. The paint of claim 3 wherein the concentration of said corrosion inhibiting composition is about 30 weight percent.

* * * * *